(No Model.)

I. B. INGLE.
HARNESS GIRTH.

No. 471,554. Patented Mar. 29, 1892.

Witnesses:
J. B. McGirr.
M. L. Moran

Inventor:
Isaac B. Ingle
per
N. W. Fitzgerald & Co.
Attorneys

THE NORRIS PETERS CO., PHOTO-LITHO., WASHINGTON, D. C.

UNITED STATES PATENT OFFICE.

ISAAC B. INGLE, OF SAYBROOK, ILLINOIS.

HARNESS-GIRTH.

SPECIFICATION forming part of Letters Patent No. 471,554, dated March 29, 1892.

Application filed October 6, 1891. Serial No. 407,846. (No model.)

*To all whom it may concern:*

Be it known that I, ISAAC B. INGLE, a citizen of the United States of America, residing at Saybrook, in the county of McLean and State of Illinois, have invented certain new and useful Improvements in Girths or Belly-Bands, of which the following is a specification, reference being had therein to the accompanying drawings.

My invention relates to certain improvements in harness, more particularly the girth or belly-band, having for its object to prevent chafing the horse or animal and convenience in adjusting or applying the same for use; and to these ends the invention consists in the novel construction and arrangement of the parts, substantially as hereinafter fully set forth, and pointed out in the claim.

Figure 1:
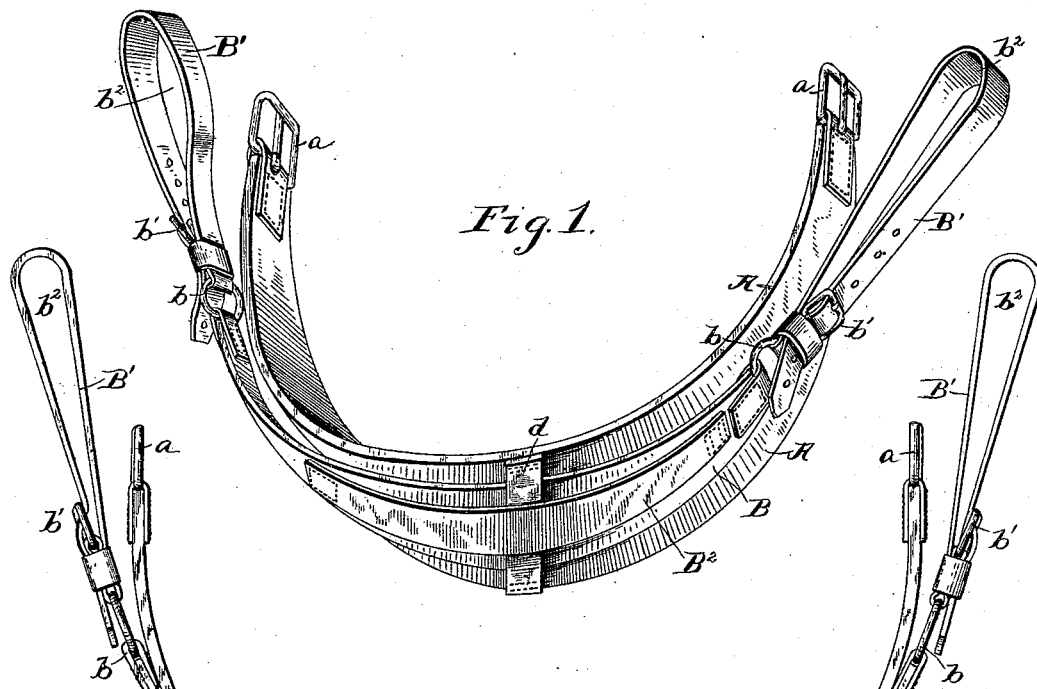
Figure 2:
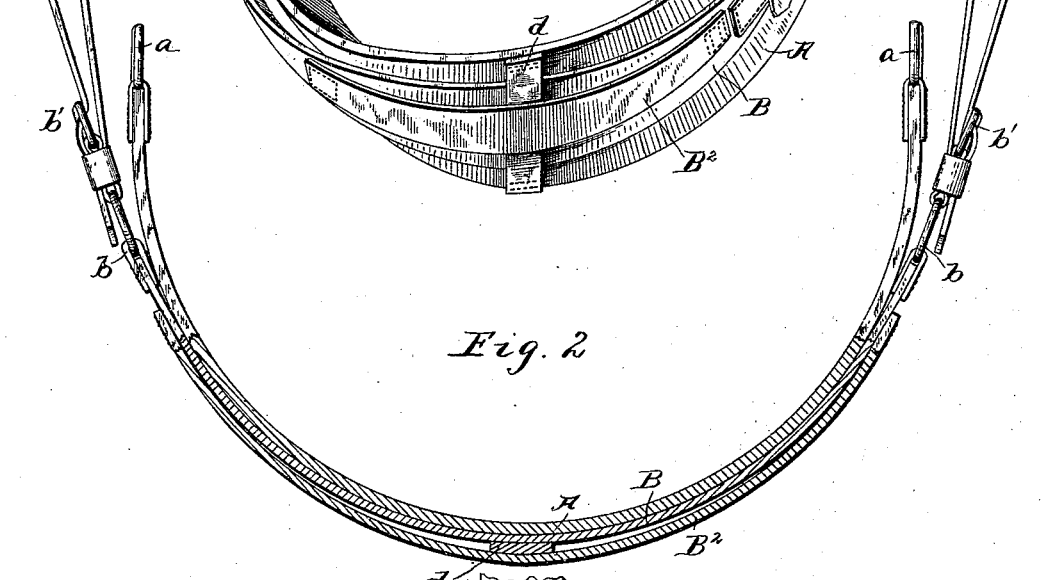
Figure 3:
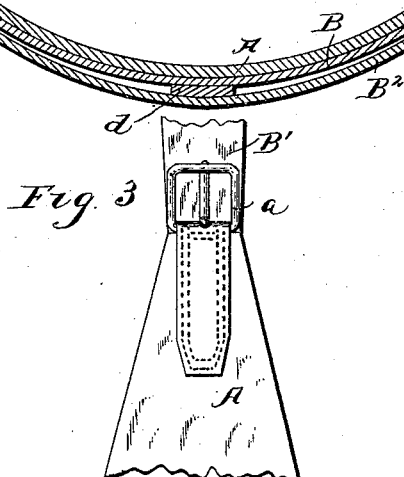

In the accompanying drawings, Figure 1 is a perspective view of my improved belly-band or girth. Fig. 2 is a vertical sectional view, and Fig. 3 is a cross-sectional view thereof.

In the drawings, A refers to the girth or strap or belly-band proper, which is broadened at its middle and narrowed toward its ends, which are provided with buckles $a$ $a$ for the connection with the back-band, as usual.

B is the shaft or thill strap, having connected to its ends $b$ two additional straps B′, adapted to be formed by buckles, as at $b'$, into loops $b^2$ for the reception of the shafts or thills, said loops themselves having snaps (not shown) for engagement or connection with the straps on the saddle.

The shaft or thill strap B is narrower than, though it may be in its general outline of corresponding shape with, the girth or belly-band A and has connected to it a strap $B^3$, similar to itself, and between these straps B $B^2$ passes a transverse loop $d$ at the middle and an adjunctive part of the belly-band or girth. By reason of this arrangement it will be seen that the horse or animal will be entirely free from chafing, since the shaft or thill strap, subject to the vibrations of the shafts or thills, is by reason of the broadened girth or belly-band removed from contact with the horse, and yet the thill-strap is permitted, by means of the transverse loop and its annexed strap, to accommodate the movements or vibrations of the shafts without affecting the animal or the horse. The thill-strap by reason of the additional straps with their buckles is adjustable to accommodate the height of the horse or animal and the thills or shafts.

Having thus fully described my invention, what I claim as new, and desire to secure by Letters Patent, is—

The centrally-broadened belly-band or girth having at the center of its broadened portion a cross or transverse strap forming a loop thereat, in combination with a narrow thill-strap passed through said loop and the additional strap connected at its ends near the ends of the thill-shaft and itself forming a loop, through which said transverse loop-forming strap is passed, substantially as set forth.

In testimony whereof I affix my signature in presence of two witnesses.

ISAAC B. INGLE.

Witnesses:
 JOHN E. BANDREAN,
 EDGAR HAMARE.